(12) United States Patent
Takeshita et al.

(10) Patent No.: US 6,606,206 B2
(45) Date of Patent: Aug. 12, 2003

(54) IMPACT ABSORBENT SHIFTING DEVICE

(75) Inventors: Shigeru Takeshita, Kanagawa (JP); Toshiyuki Yasuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/854,643

(22) Filed: May 15, 2001

(65) Prior Publication Data

US 2002/0044363 A1 Apr. 18, 2002

(30) Foreign Application Priority Data

May 16, 2000 (JP) ........................................ 2000-144053

(51) Int. Cl.$^7$ ............................................... G02B 15/14
(52) U.S. Cl. ....................... 359/704; 359/703; 359/819; 359/811; 396/526; 362/455; 353/100
(58) Field of Search ................................. 359/704, 703, 359/701, 706, 819, 826, 827, 811; 396/526; 362/455; 353/100

(56) References Cited

U.S. PATENT DOCUMENTS 3,594,068 A * 7/1971 Kirstein et al. ............. 359/826
5,765,048 A * 6/1998 Nomura et al. ............... 396/72

* cited by examiner

Primary Examiner—Hung Xuan Dang
Assistant Examiner—Joseph Martinez
(74) Attorney, Agent, or Firm—Robin, Blecker & Daley

(57) ABSTRACT

There is provided an optical device which comprises a fixed barrel, a movable cam ring, and collars and abutments. The movable cam ring is shifted relative to the fixed barrel to move an optical unit, the movable cam ring being fitted to the fixed barrel. Collars and abutments can be engaged with each other when the movable cam ring is in a predetermined positional relationship with respect to the fixed barrel. The collars and abutments preventing the movable cam ring from being disengaged from the fixed barrel and displaced in a direction along an optical axis relative to the fixed barrel.

18 Claims, 16 Drawing Sheets

MOVABLE RANGE

DIRECTION OF DRIVING
WHEN LENS BARREL IS EXTENDED

IMPACT ABSORBENT SHIFTING DEVICE

BACKGROUND OF THE INVENTION

1. Field of the Invention

This invention relates to an optical device such as lens barrels used in image pickup devices, and more particularly to a support mechanism for supporting the optical device.

2. Prior Art

Conventionally, an image pickup device has been proposed which is provided with a zoom mechanism having lens barrels composed of a fixed barrel rigidly fixed to the body of the image pickup device and having a cam groove formed in an inner peripheral surface thereof, and a moving cam ring fitted in the cam groove, wherein the moving cam ring is driven for rotation by a motor so as to move a zoom lens.

In the image pickup device of this kind, the moving cam ring is supportedly fitted in the cam groove of the fixed barrel only by means of three followers formed with tapers.

Therefore, when an external force, e.g. an impact, is applied to the lens barrel in an extended position, there is a fear that the moving cam ring becomes disengaged from the cam groove of the fixed barrel.

One way to solve this problem may be to employ a method of using followers with no tapers for supporting the moving cam ring in the fixed barrel. This method, however, has the disadvantage that the lens barrel can be broken, although disengagement of the moving cam ring can be prevented. Further, another problem may arise, that is, the moving cam ring cannot be centered.

SUMMARY OF THE INVENTION

The present invention has been made in view of the above problems, and an object thereof is to provide an optical device which is free from disengagement of coupling elements of a coupling mechanism for moving an optical unit even if an external force, such as an impact, is applied to the optical device.

To attain the above object, the present invention provides an optical device comprising a first barrel, a second barrel that is shifted relative to the first barrel for moving an optical unit, the second barrel being fitted to the first barrel, and first and second engaging portions which can be engaged with each other when the second barrel is in a predetermined positional relationship with respect to the first barrel, the first and second engaging portions preventing the second barrel from being disengaged from the first barrel and displaced in a direction along an optical axis relative to the first barrel.

Preferably, the first barrel comprises a fixed barrel.

More preferably, the second barrel comprises a moving cam ring.

Preferably, the first and second engaging portions comprise protrusions which cane be engaged with each other.

Preferably, the first and second engaging portions are provided on the first barrel and the second barrel, respectively.

Preferably, the second barrel is brought into the predetermined positional relationship with respect to the first barrel, when the second barrel is shifted forward relative to the first barrel.

More preferably, when the second barrel is in the predetermined positional relationship with respect to the first barrel, the second engaging portion is positioned in front of the first engaging portion.

Preferably, the optical device comprises a lens barrel.

Preferably, the optical device comprises an image pickup device.

The above and other objects, features, and advantages of the invention will become more apparent from the following detailed description taken in conjunction with the accompanying drawings.

BRIEF DESCRIPTION OF THE DRAWINGS

FIGS. 12B and 12C are timing charts which are useful in explaining a method of detecting the rotation of the zoom motor, in which;

FIG. 12B is a timing chart showing output waveforms of photo interrupters 54, 55 exhibited when the zoom motor is rotating in one direction and an output signal from a photo interrupter 48 for determining an initial position (zoom reset position); and FIG. 12C is a timing chart similar to FIG. 12B, showing output waveforms of the photo interrupters 54, 55 exhibited when the zoom motor is rotating in the other or opposite direction and an output signal from the photo interrupter 48;

FIG. 18 is a flowchart showing the procedure of a control operation of the FIG. 17 control system when the power of the camera is turned on.

DETAILED DESCRIPTION OF PREFERRED EMBODIMENT

The present invention will now be described in detail with reference to the drawings showing an embodiment thereof.

Figure 1:
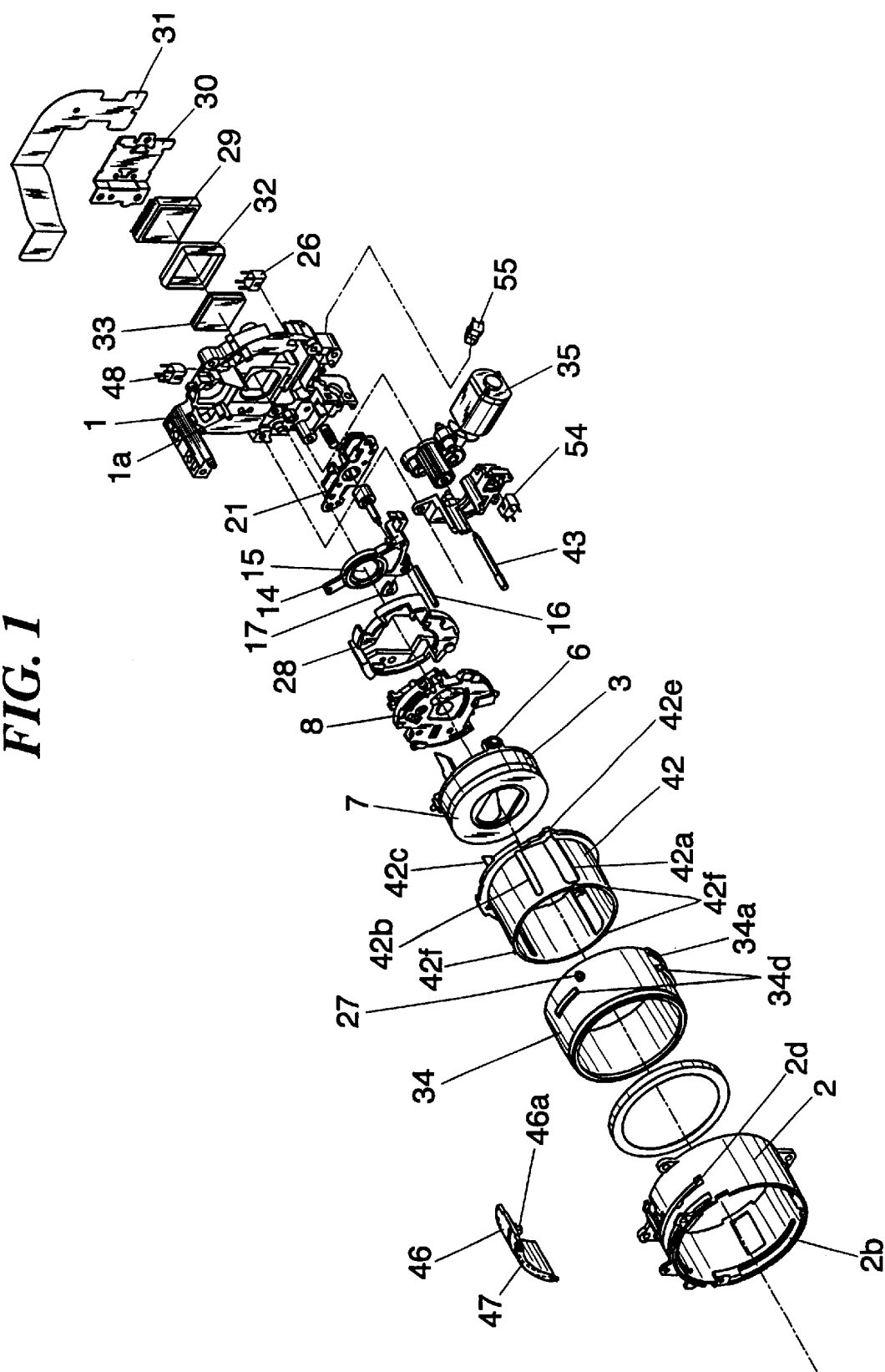
FIG. 1 is an exploded perspective view of a lens barrel block of a camera as an image pickup device to which is applied an optical device according to an embodiment of the present invention.
Figure 2:
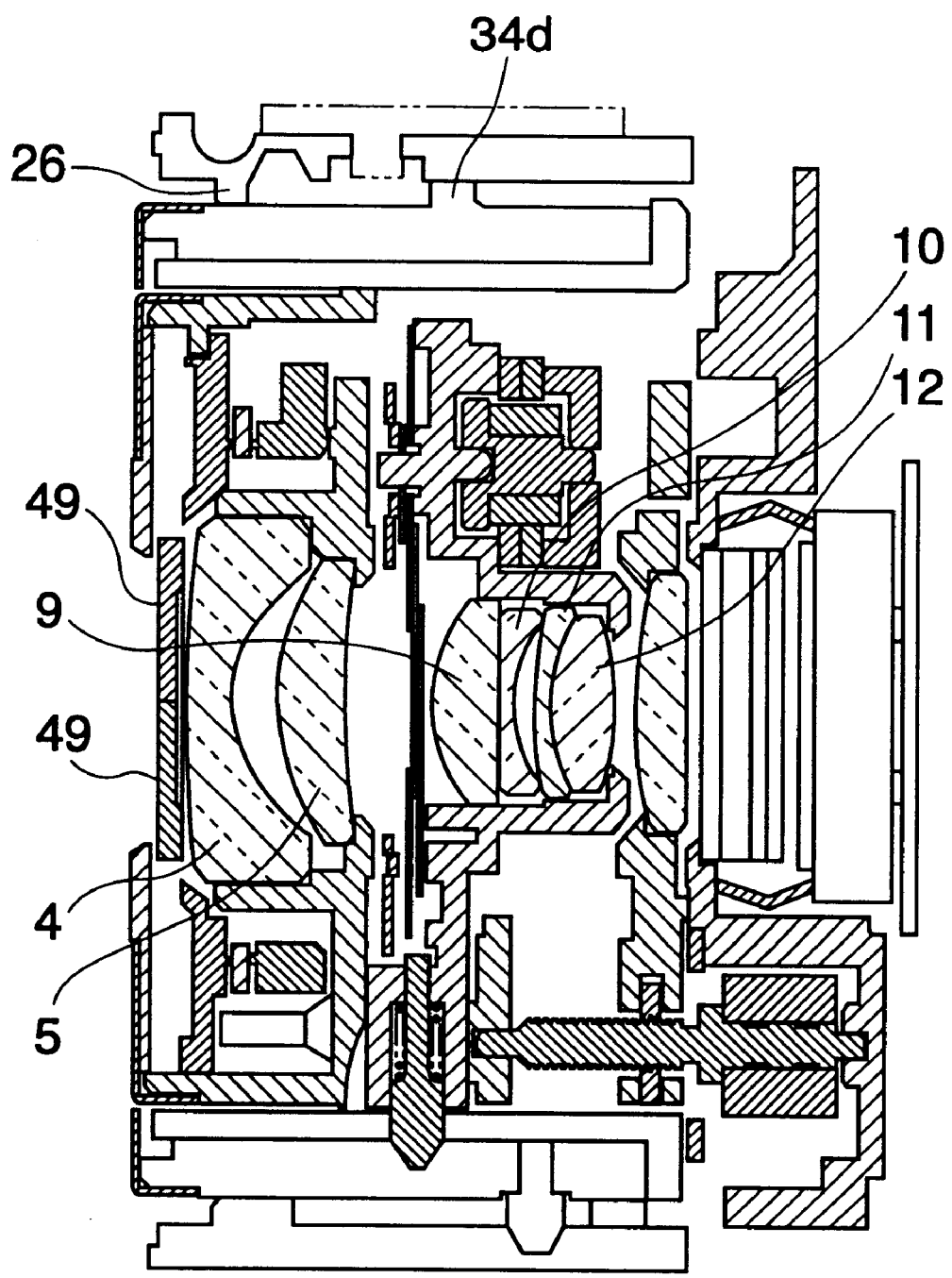
FIG. 2 is a longitudinal sectional view showing the lens barrel block in a collapsed position.
Figure 3:
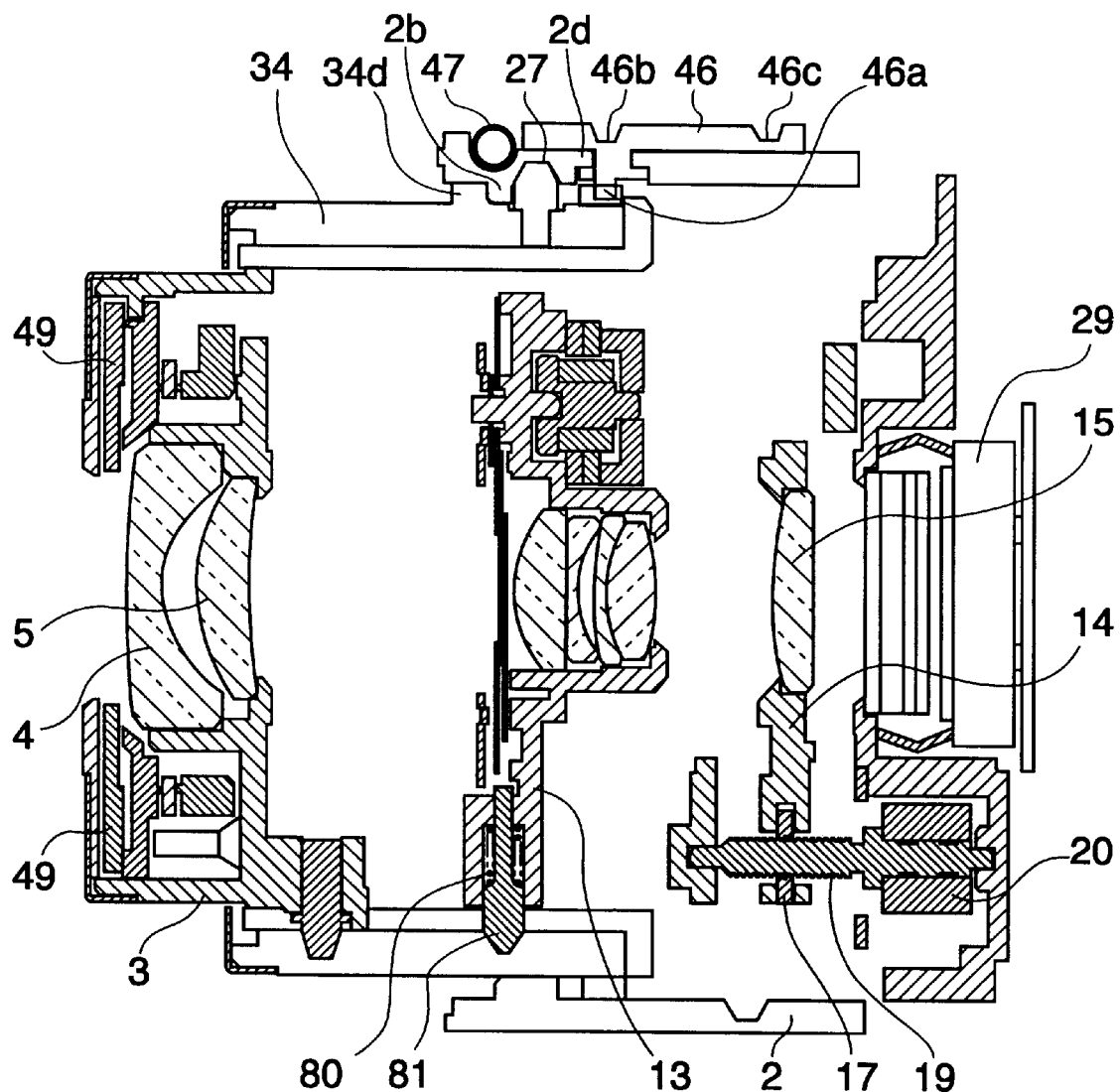
FIG. 3 is a longitudinal sectional view showing the lens barrel block in a wide-angle position.
Figure 4:
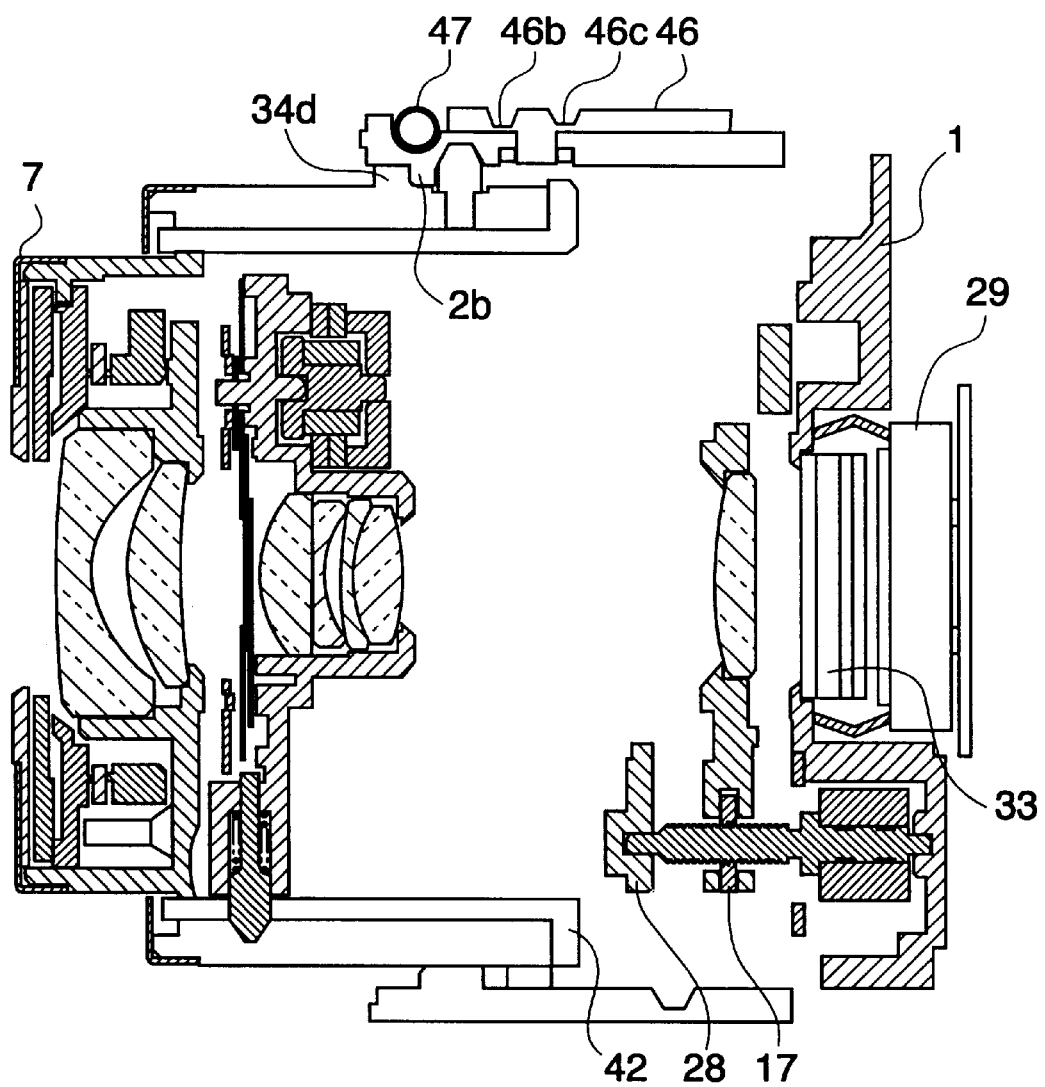
FIG. 4 is a longitudinal sectional view showing the lens barrel block in a telephoto position.

FIG. 1 is an exploded perspective view of a lens barrel block of a camera as an image pickup device to which is applied an optical device according to an embodiment of the present invention. FIGS. 2 to 4 are longitudinal sectional views of the lens barrel block, in which FIG. 2 shows the lens barrel block in a collapsed position, FIG. 3 shows the lens barrel block in a wide-angle position, and FIG. 4 shows the lens barrel block in a telephoto position.

In FIG. 1, reference numeral 1 designates a base of a lens barrel unit, which forms a frame structure of the lens barrel unit fixed to a body of the camera together with a fixed barrel 2 rigidly screwed onto a front end of the base 1. Reference numeral 3 designates a first-group lens barrel that holds lenses 4 and 5. Further, the first-group lens barrel 3 has three follower pins 6, which each have a tapered end portion and press-fitted into an outer peripheral surface of the lens barrel 3, and a cap 7 rigidly bonded to a front surface of the lens barrel 3.

Figure 5:
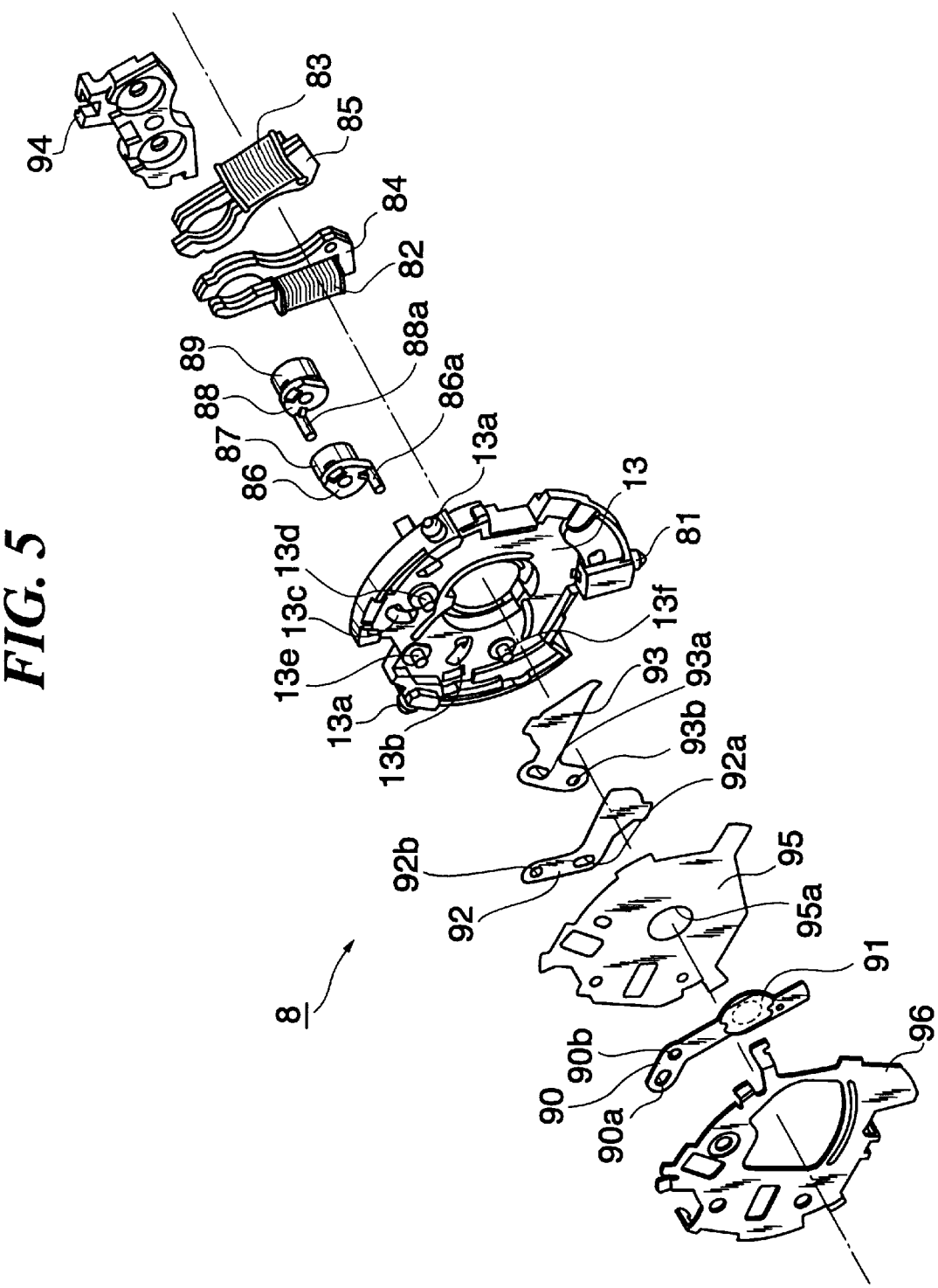
FIG. 5 is an exploded perspective view of a shutter unit.

Reference numeral 8 designates a shutter unit that holds lenses 9, 10, 11, and 12. FIG. 5 is an exploded perspective view of the shutter unit 8. As shown in the figure, a diaphragm bottom board 13 has an outer periphery thereof integrally formed with two followers 13a each having a tapered portion at a distal end thereof, and one movable follower 81 that is movable in a direction orthogonal to the optical axis of the lens barrel unit. The above three followers are arranged at circumferentially equal intervals on the outer periphery of the diaphragm bottom board 13. The movable follower 81 is urged radially outwardly of the diaphragm bottom board 13 by a compression spring 80 (FIG. 3). This makes it possible to prevent the centers of the lenses 9, 10, 11, and 12 held by the shutter unit 8 from deviating from the optical axis, thereby preventing degradation of photographing accuracy of the camera.

Figure 6:
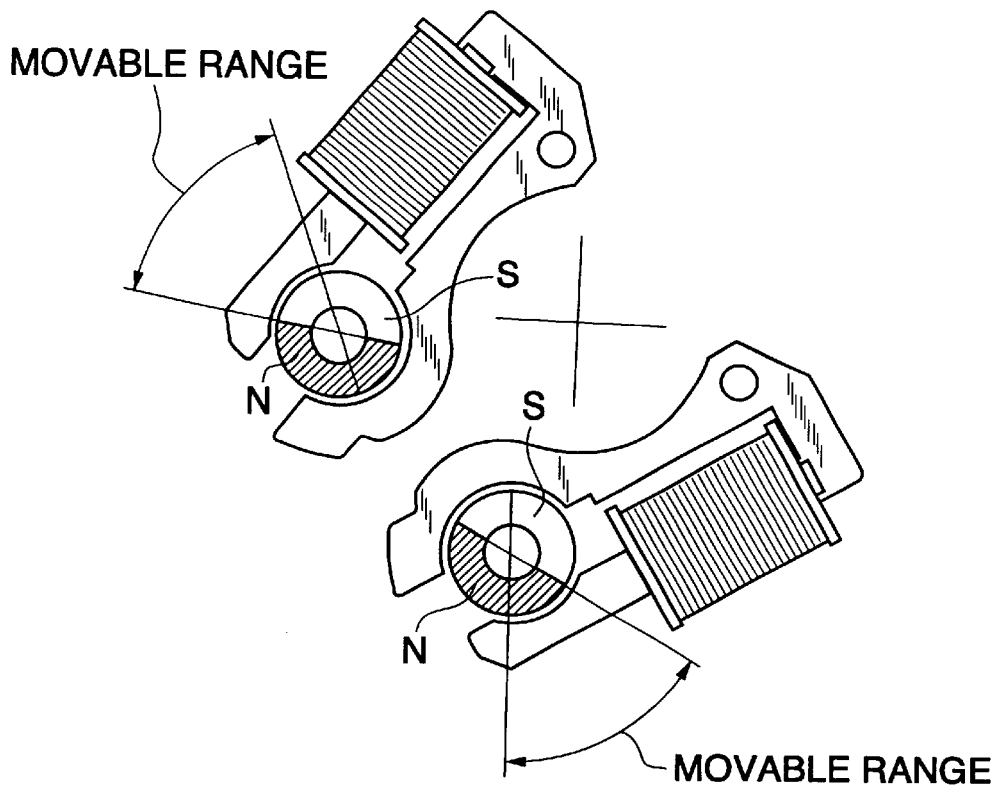
FIG. 6 is a view showing angles of rotation of respective rotors of a shutter and a diaphragm.

Reference numerals 82 and 83 designate coils wound around respective bobbins. When the coils 82 and 83 are energized, respective magnetic fluxes generated by the energization cause, via yokes 84 and 85, magnetic torque to be generated in magnets 87 and 89 to thereby pivotally move arms 86 and 88 integrally formed with the magnets 87 and 89. The angles of pivotal movement of the arms 86 and 88 are limited by openings 13b and 13c formed in the diaphragm bottom board 13, such that the arms 86 and 88 can be moved within movable ranges shown in FIG. 6. In other words, respective arm portions 86a and 88a of the arms 86 and 88 abut on opposite ends of the respective openings 13b and 13c to stop the respective pivotal movements of the arms 86 and 88.

When the pivotal movements of the arms 86 and 88 are stopped, the arms 86 and 88 are halted at positions where the magnets 87 and 89 magnetically attract the yokes 84 and 85 according to their polarities. Hence, the arms 86 and 88 are held in the halted state even after the energization of the coils 82 and 83 is stopped. Further, also when the arms 86, 88 are halted after the inverted pivotal movements of the arms 86 and 88 which cause the respective arm portions 86a and 88a thereof to abut on the ends of the openings 13b and 13c opposite to the above-mentioned ends, the magnetically attracting forces are similarly applied to the yokes 84 and 85 at the respective halted positions of the arms 86 and 88. This makes it possible to hold the arms 86 and 88 in the halted state without currents flowing through the coils 82 and 83.

Reference numeral 90 designates a diaphragm blade which has a slot 90a with the arm portion 86a of the arm 86 inserted therein. Further, the diaphragm blade 90 has a hole 90b rotatably fitted on a pivot 13d of the diaphragm bottom board 13. The diaphragm blade 90 has an aperture which is circular in shape, and further has an ND filter 91 attached thereto to thereby limit the amount of light. This is because in a high-density image pickup device of a recent digital camera, when the diameter of the aperture is small, an adverse influence of diffraction, which can degrade the quality of a formed image, cannot be neglected, and therefore, the ND filter is provided to limit the amount of light without degrading the quality of the formed image.

Reference numerals 92 and 93 designate shutter blades. The shutter blades 92 and 93 have holes 92b and 93b, respectively, which are rotatably fitted on respective pivots 13e and 13f provided on the diaphragm bottom board 13. The arm portion 88a formed on the arm 88 is inserted into slots 92a and 93a formed through the respective shutter blades 92 and 93.

Reference numeral 94 designates a cap for fixedly holding the coils 82 and 83, and the yokes 84 and 85, and rotatably holding the arm 86 (with the magnet 87) and the arm 88 (with the magnet 89) between itself and the diaphragm bottom board 13. Reference numeral 96 designates a casing for preventing the diaphragm blade 90 from being detached from the shutter unit 8. Reference numeral 95 designates a sheet for preventing interference between the diaphragm blade 90 and the shutter blades 92 and 93. Further, the sheet 95 has an open aperture 95a formed through a central portion thereof, which is open when the diaphragm blade 90 is retreated.

Figure 7:
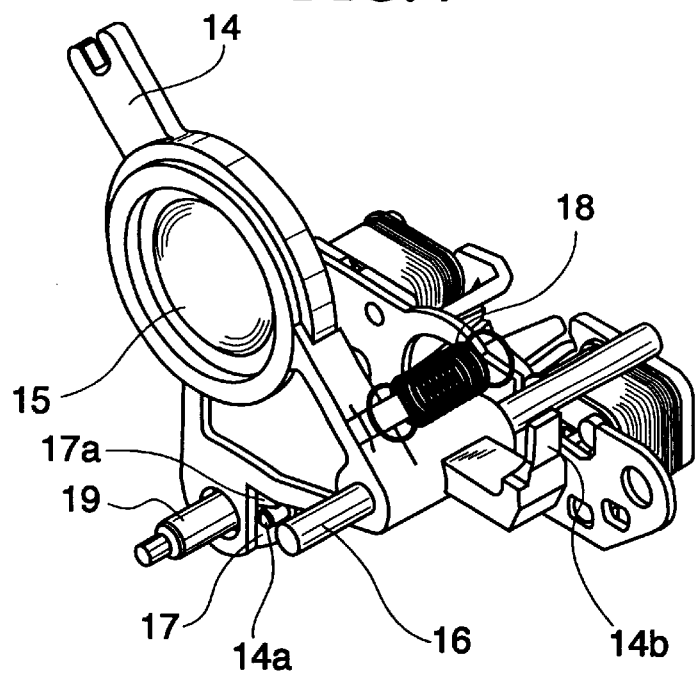
FIG. 7 is a perspective view showing a three-group lens barrel and a stepping motor.

In FIG. 1, reference numeral 14 designates a third-group lens barrel that holds a lens 15. The third-group lens barrel 14 is guided by a guide bar 16 and a guide shaft 1a provided on the base 1. Further, as shown in FIG. 7, the lens barrel 14 has its position in an axial direction, i.e. a direction along the optical axis limited by a nut 17 formed with an internal or female thread and held between arm portions of the lens barrel 14, and is biased by a tension spring 18 in a direction in which the lens barrel 14 is withdrawn. The nut 17 has a slit 17a formed therein, in which a projection 14a of the lens barrel 14 is fitted, whereby the rotation of the nut 17 is restrained by the lens barrel 14.

In FIG. 3, reference numeral 19 designates a screw shaft integrally formed with a magnet 20, which has a trailing threaded portion mating with the female thread of the nut 17.

Figure 8:
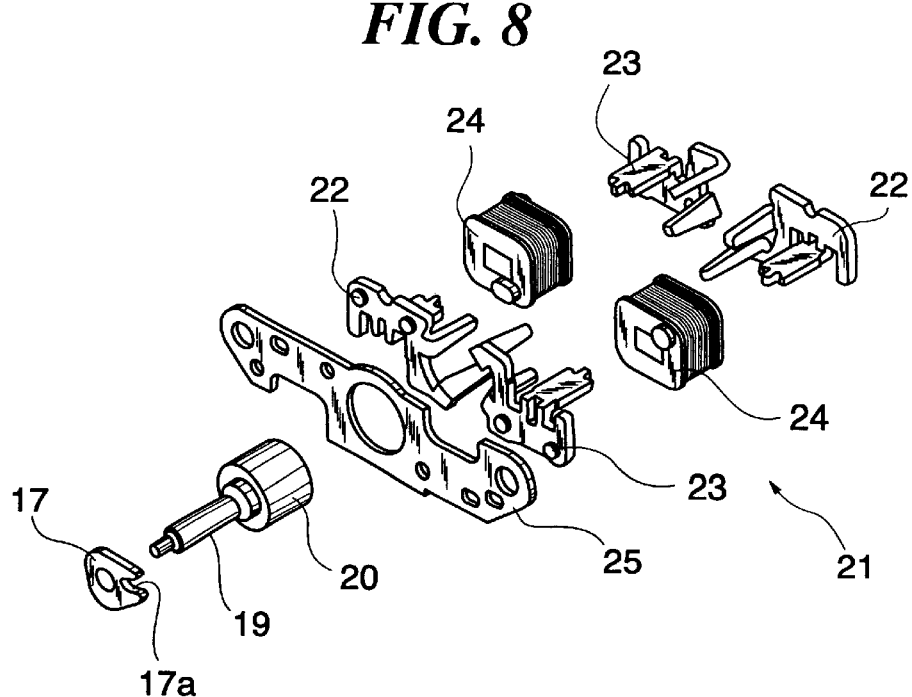
FIG. 8 is an exploded perspective view of the stepping motor.

In FIG. 1, reference numeral 21 designates a stepping motor for driving the third-group lens barrel 14. As shown in FIG. 8, the stepping motor 21 includes a yoke plate 25 to which are attached two sets of components, i.e. a pair of yokes 22, 23 arranged in a manner opposed to each other in the axial direction, and coils 24, 24 wound around respective bobbins and associated with the respective yokes 22, 23, such that the two sets are opposed to each other with the magnet 20 positioned therebetween. The stepping motor 21 is rigidly fixed to the base 1 by screwing the yoke plate 25 onto the base 1.

In FIG. 1, reference numeral 26 designates a photo interrupter rigidly fixed to the base 1. The photo interrupter 26 is arranged at a position where a slit plate 14b integrally fixed to the third-group lens barrel 14 is permitted to enter or retreat from a slit of the photo interrupter 26. Reference numeral 28 designates a cap rigidly fixed to the base 1, to which is fixed a distal end side of the guide bar 16, to rotatably hold the screw shaft 19.

In FIG. 1, reference numeral 29 designates an image pickup device which is rigidly bonded to and held by a holding plate 30 rigidly screwed onto the base 1. Reference numeral 31 designates a flexible base board to which the image pickup device 29 is soldered. The image pickup device 29 photoelectrically converts an input optical image to an image signal indicative of the input optical image, and supplies the image signal to a signal processing circuit, referred to hereinafter. Reference numerals 32 and 33 designate a dustproof rubber and an LPF (Low Pass Filter), respectively, both of which are rigidly fixed to the base 1 by bonding or the like.

Figure 10:
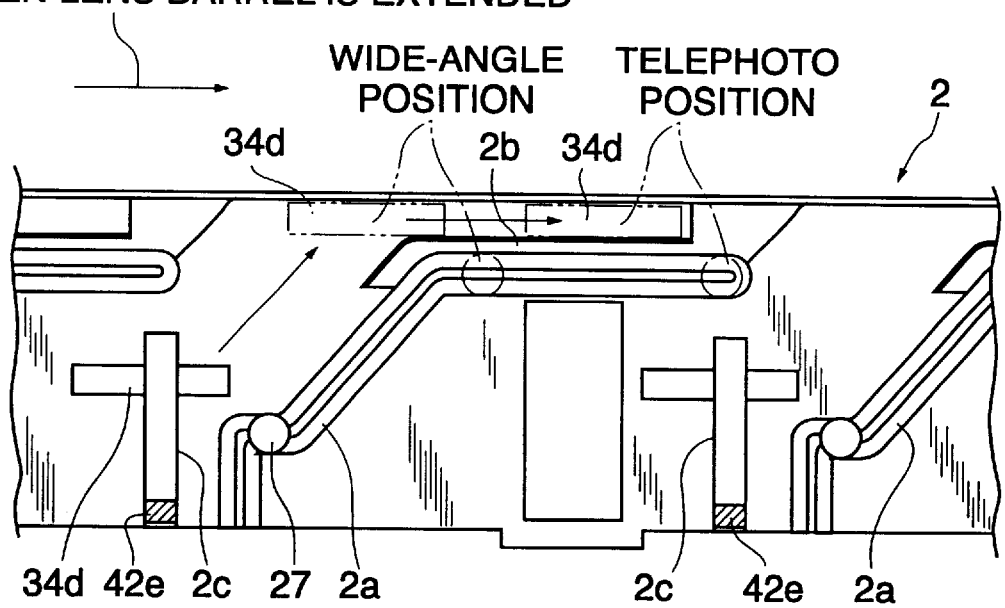
FIG. 10 is a view showing changes in relative positional relationship between a collar provided on an outer peripheral surface of the moving cam ring and an abutment provided on an inner peripheral surface of a fixed barrel.

Referring to FIG. 10, the fixed barrel 2 has an inner peripheral surface thereof formed with a cam groove 2a, in which is engaged a metal follower pin 27 press-fitted in the moving cam ring 34. Thus, the moving cam ring 34 is rotated along the cam groove 2a, whereby the moving cam ring 34 is moved in the direction along the optical axis.

Figure 11:
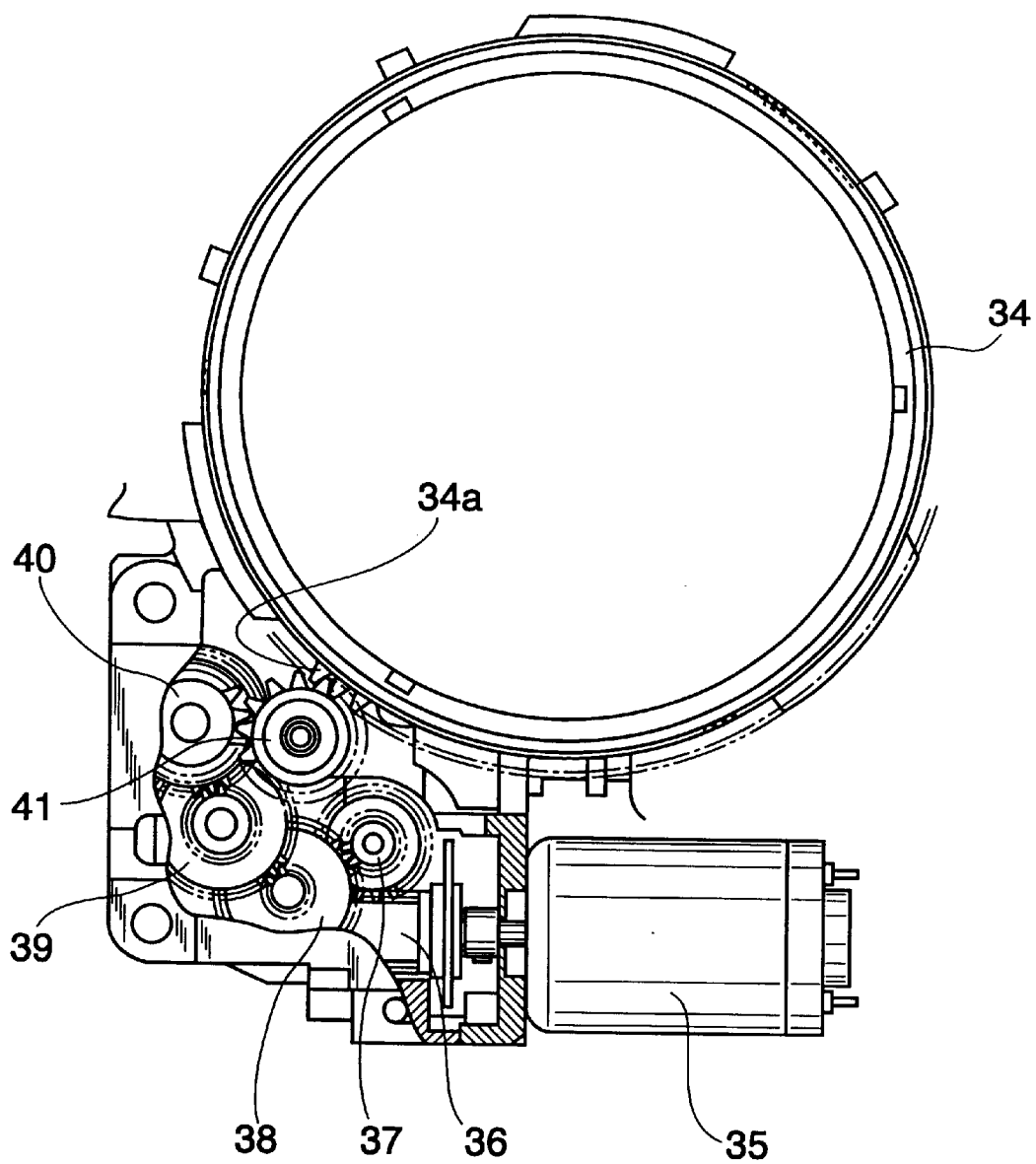
FIG. 11 is a view, partly cut away, showing a gear train connected to a zoom motor.
Figure 12A:
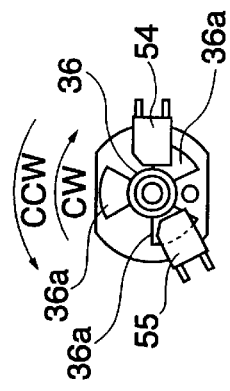
FIG. 12A is a view showing the arrangement of a device for detecting the rotation of the zoom motor.

The moving cam ring 34 has an outer periphery thereof formed with gear teeth 34a. As shown in FIG. 11, a zoom motor 35 has a rotational shaft thereof connected to the gear teeth 34a via a reduction gear train comprised of reduction gears 36 to 41. The torque of the zoom motor 35 is transmitted to the gear teeth 34a through the reduction gears 36 to 41 such that the rotational speed of the zoom motor 35 is progressively reduced, whereby the moving cam ring 34 is rotatively driven to move in the direction along the optical axis. Referring to FIG. 12A, the reduction gear 36 has three blades 36a mounted thereon for detecting the rotation of the zoom motor 35, and photo interrupters 54 and 55 are arranged at an angle of 150 degrees such that the three blades 36a can block slits of the photo interrupters 54 and 55. Further, the reduction gear 41 and a shaft 43 thereof are made of metal.

Figure 13:
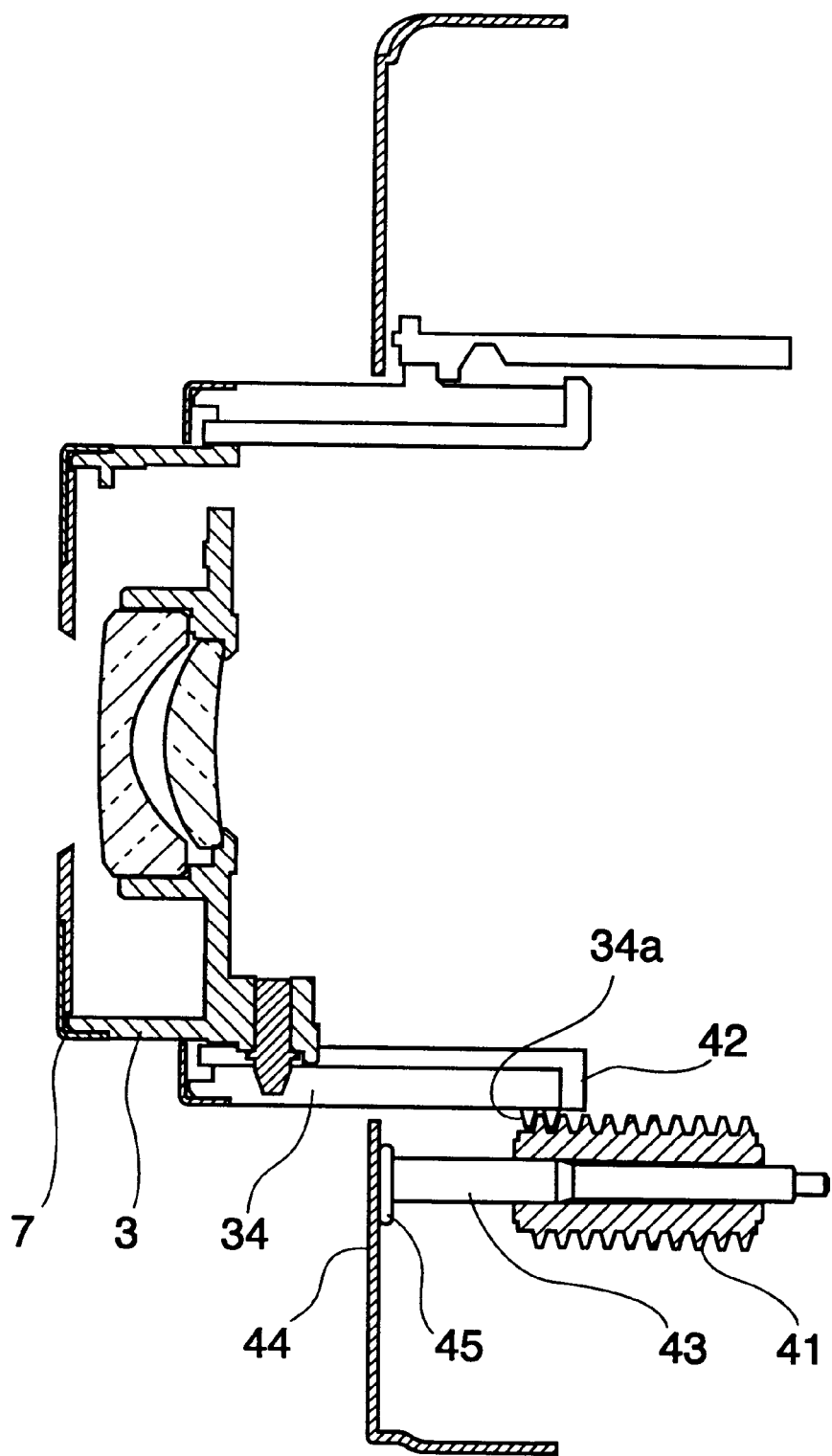
FIG. 13 is a sectional view showing how the lens barrel is connected to the body of the camera.

As shown in FIG. 13, nickel-plated gaskets 45 are affixed to the inner surface of a casing 44 of the body of the pickup device for imparting resilience to the assembly of the casing 44 and components attached thereto via the gaskets 45. Therefore, when the lens barrels are assembled with the body of the pickup device, the lens barrels are bought into intimate contact with the body of the pickup device. Further, the first-group lens barrel 3 and the moving cam ring 34 are molded from a mixture of molding resin and carbon fiber.

In FIG. 1, reference numeral 46 designates a finder cam plate. As shown in FIGS. 3 and 4, the finder cam plate 46 has an outer surface thereof formed with taper cam grooves 46b and 46c for driving a finder lens for zooming operation. The inner surface of the finder cam plate 46 is formed with a guide key 46a fitted in a groove 2d formed in the fixed barrel 2 such that the finder cam plate 46 can be rotated along the outer periphery of the fixed barrel 2. Reference numeral 47 designates a tension spring with one end thereof rigidly fixed to the finder cam plate 46 and the other end thereof rigidly fixed to the fixed barrel 2 such that the finder cam plate 46 is normally biased toward the wide-angle position.

A straight advance guide barrel 42 shown in FIG. 1 is rotatably fitted in the moving cam ring 34. The straight advance guide barrel 42 includes a projection 42e which is fitted in a groove 2c (see FIG. 10) formed in the fixed barrel 2 such that the straight advance guide barrel 42 is prevented from rotating with respect to the fixed barrel 2. Further, the straight advance guide barrel 42 has three projections 42f formed on a front end thereof and fitted in a groove 34e (see FIG. 9) formed in the inner surface of the moving cam ring 34.

Figure 9:
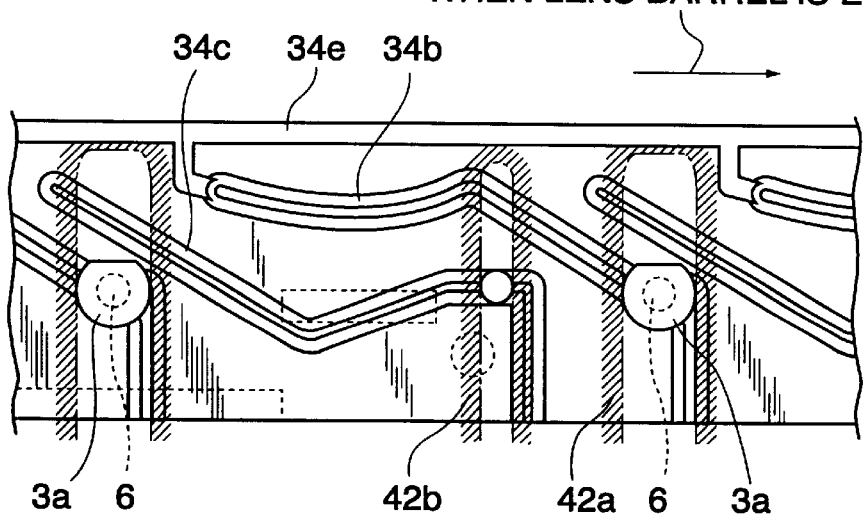
FIG. 9 is a view showing cam grooves formed in an inner surface of a moving cam ring.

With this construction, the straight advance guide barrel 42 and the moving cam ring 34 are moved in unison with each other in the direction along the optical axis while they can rotate relative to each other. As shown in FIG. 9, the metal follower pins 6 provided on the first-group lens barrel 3 are engaged with cam grooves 34b formed in the moving cam ring 34 while straight movement grooves 42a formed in the straight advance guide barrel 42 are engaged with straight moving pins 3a provided on the first-group lens barrel 3. The straight movement grooves 42a and the straight moving pins 3a cooperate to restrain rotation of the first-group lens barrel 3, and cause the first-group lens barrel 3 to be moved in the direction along the optical axis as the moving cam ring 34 is rotated. Similarly, the shutter unit 8 is engaged with a cam groove 34c formed in the moving cam ring 34 and a straight movement groove 42b formed in the straight advance guide barrel 42, whereby the straight movement groove 42b restrains rotation of the shutter unit 8. Thus, when the moving cam ring 34 is rotated, the shutter unit 8 is moved along the cam groove 34c in the direction along the optical axis.

The moving cam ring 34 has a collar means 34d provided on an outer peripheral surface thereof, while the fixed barrel 2 has an abutment means 2b provided on an inner peripheral surface thereof at a location where the abutment means 2b can be brought into contact with the collar means 34d. The collar means 34d is comprised of three elongated members (collars) which circumferentially extend on the outer peripheral surface of the moving cam ring 34 at equal intervals. The abutment means 2b is comprised of three elongated members (abutments) each of which is longer than the elongated members of the collar means 34d, and which circumferentially extend on the inner peripheral surface of the fixed barrel 2 at diametrically opposite locations. As shown in FIGS. 2 and 10, when the moving cam ring 34 is rotated to shift from the collapsed position to the wide-angle position, that is when a picture is not taken, the collar means 34d is positioned on the image surface side with respect to the abutment means 2b on the fixed barrel 2. On the other hand, as shown in FIGS. 3, 4 and 10, when the moving cam ring 34 is positioned in a range from the wide-angle position to the telephoto position in which a picture can be taken, that is when a picture is taken, the collar means 34d is always positioned on the object side with respect to the abutment means 2b, where the collar means 34d can abut on the abutment means 2b.

With this construction, if an external force acts on the first-group lens barrel 3 and the moving cam ring 34 when the lens barrel is in a position where a picture can be taken, the external force is absorbed by the abutment means 2b provided on the inner peripheral surface of the fixed barrel 2, whereby the follower pin 27 press-fitted in the moving cam ring 34 can be prevented from becoming disengaged from the cam groove 2a formed in the fixed barrel 2, thereby preventing the lens barrel from being damaged.

It should be noted that as shown in FIG. 1, the collar means 34d and the abutment means 2b are elongated circumferentially of the moving cam ring 34 and the fixed barrel 2, with the longer sides of the collar means 34d and the abutment means 2b being parallel with each other. Therefore, when the collar means 34d abuts on the abutment means 2b, the longer sides of these means are in contact with each other over the whole and a major part of lengths thereof, which contributes to enhancement of the effects described above.

Further, as shown in FIG. 13, the first-group lens barrel 3, the moving cam ring 34, the reduction gear 41 of the reduction gear train, the shaft 43, and the gaskets 45 are electrically connected to the casing 44 which is grounded to an electric circuit, so that even if static electricity is generated in the camera body, the static electricity does not adversely affect the electric circuit.

Figure 17:
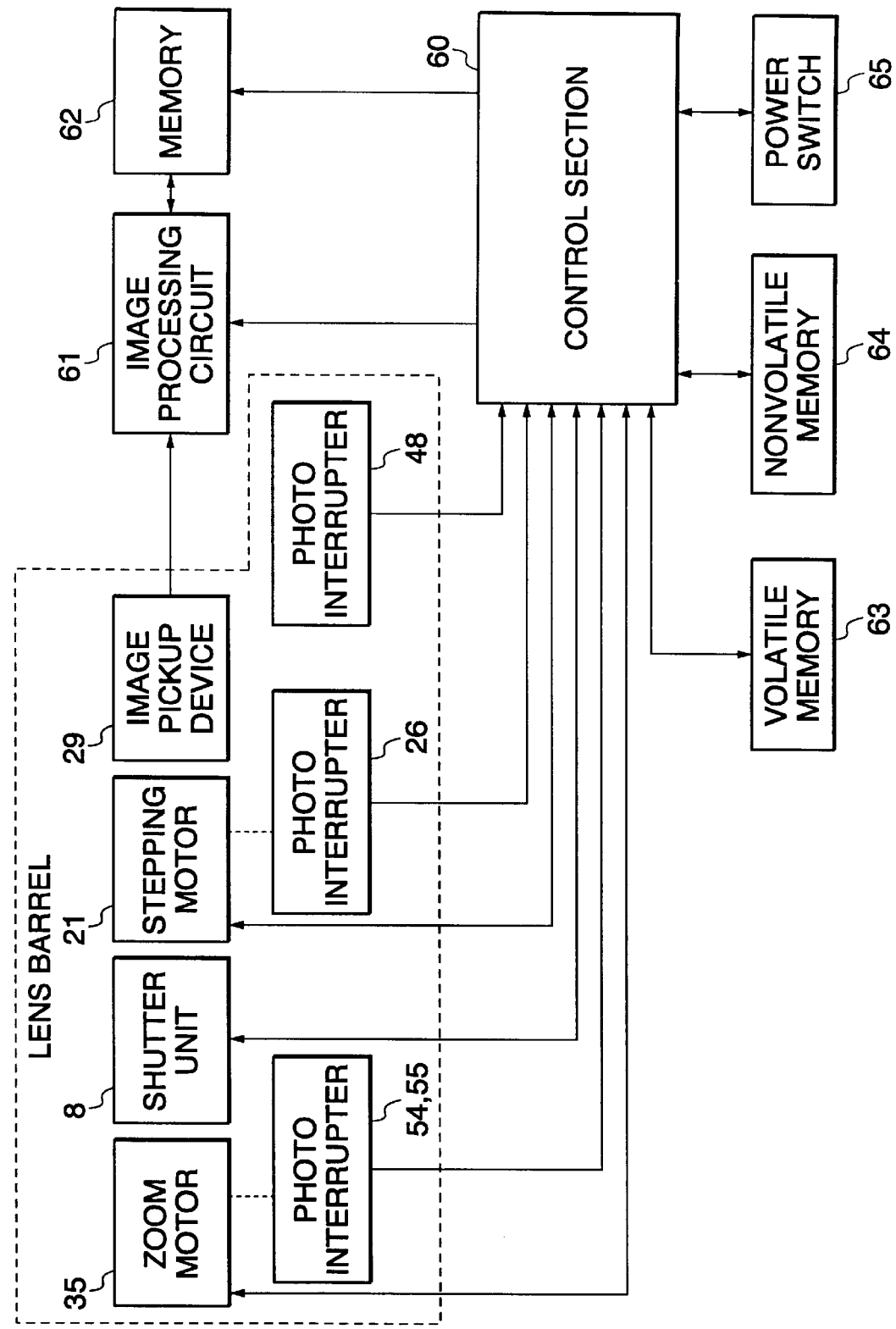
FIG. 17 is a block diagram showing the arrangement of a control system of the camera to which is applied the optical device according to the invention.

FIG. 17 is a block diagram schematically showing the arrangement of a control system of the camera according to the embodiment. An image signal output from the image pickup device 29 is subjected to predetermined processes, such as color conversion and gamma correction, by an image processing circuit 61, and then stored in a memory 62, such as a card medium.

A control section 60 carries out overall control of the camera. More specifically, the control section 60 controls driving of the stepping motor 21, the shutter unit 8, and the zoom motor 35 while monitoring outputs from the photo interrupters 54 and 55 within the lens barrel, the photo interrupter 26, and a photo interrupter 48 for detecting a zoom reset, to thereby carry out distance measurement control, exposure control, and zooming control. Further, the control section 60 also controls the above-mentioned signal processing and the operation of the memory 62.

Reference numeral 64 designates an electrically erasable/recordable nonvolatile memory which is formed by an EEPROM, for instance. Reference numeral 63 designates an electrically erasable/recordable volatile memory for storing variables used in controlling the camera. The memory 63 is formed e.g. by a SRAM (static RAM).

Next, operations carried out when the power is turned on and when it is turned off will be described with reference to respective flowcharts shown in FIGS. 18 and 19.

Figure 18:
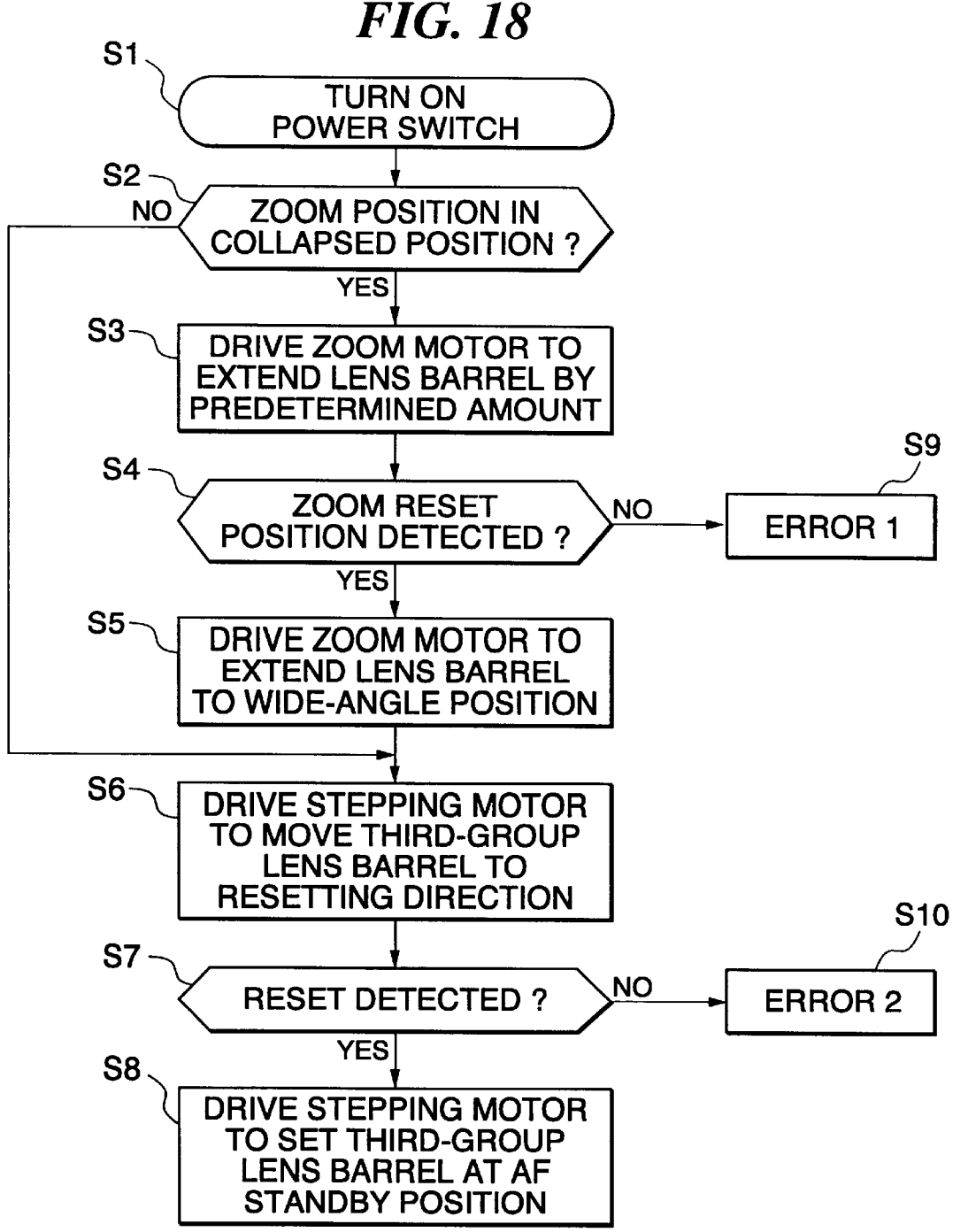

Referring to FIG. 18, when a power switch 65 (see FIG. 7) of the camera is turned on at a step S1, it is determined at a step S2 whether or not the lens barrel is in the collapsed position. If it is determined that the lens barrel is in the collapsed position, the zoom motor 35 is driven for rotation to thereby extend the lens barrel by a predetermined amount at a step S3.

At this time, as described hereinbefore, the torque of the zoom motor 35 is transmitted to the gear teeth 34a formed on the moving cam ring 34 through the reduction gear train of the reduction gears 36 to 41 (see FIG. 11). Then, the moving cam ring 34 is rotated clockwise as viewed in FIG. 11 and a lens barrier 49 incorporated in the first-group lens barrel 3 (see FIG. 3) starts to open.

When the moving cam ring 34 is further rotated, normally, the lens barrel is extended to an initial position. This initial position of the lens barrel is detected such that a light shielding plate 42c arranged on the bottom of the straight advance guide barrel 42 blocks light incident to the photo interrupter 48 bonded to the base 1 to thereby cause switching of an output signal from the photo interrupter 48. Therefore, it is determined at a step S4 whether or not the output signal from the photo interrupter 48 has been switched within a predetermined time period. If the output signal from the photo interrupter 48 has not been switched within the predetermined time period, it means that the lens barrel has not been properly extended from the collapsed position into the initial position, and therefore a first error handling process is carried out at a step S9.

As described hereinabove, the reduction gear 36 of the reduction gear train has the three blades 36a arranged thereon. The passing of these blades 36a is detected by the photo interrupters 54 and 55, whereby the rotation of the zoom motor 35 is converted into pulse waves, and the pulse waves are counted to detect a number of rotations of the zoom motor 35. The number of rotations of the zoom motor 35 is counted with reference to the above-mentioned initial position of the lens barrel, and numbers of rotations corresponding to the respective zoom positions of the lens barrel, i.e. the wide-angle position, a middle position, and the telephoto position are stored in the nonvolatile memory 64.

To move or extend the lens barrel into a desired one of the zoom positions with accuracy, it is necessary to reliably count the number of rotations of the zoom motor 35 up to a corresponding one of the numbers of rotations stored in the nonvolatile memory 64. However, the rotation of the zoom motor 35 cannot be stopped instantly only by stopping energization of the zoom motor 35, due to inertia of a rotor of the zoom motor itself and the gears associated therewith, which sometimes causes excessive rotation of the zoom motor 35. To overcome this problem, a current is caused to flow to the zoom motor 35 so as to drive the same in a direction of reverse rotation to cause the zoom motor 35 to be stopped instantly. Therefore, unless the direction of rotation of the zoom motor 35 is taken into consideration, the number of rotations of the zoom motor 35 cannot be counted accurately.

Figure 12B:
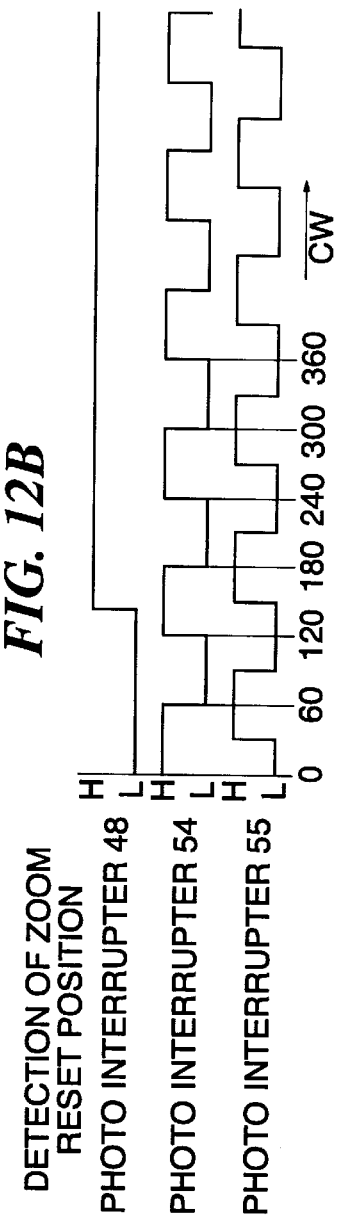
Figure 12C:
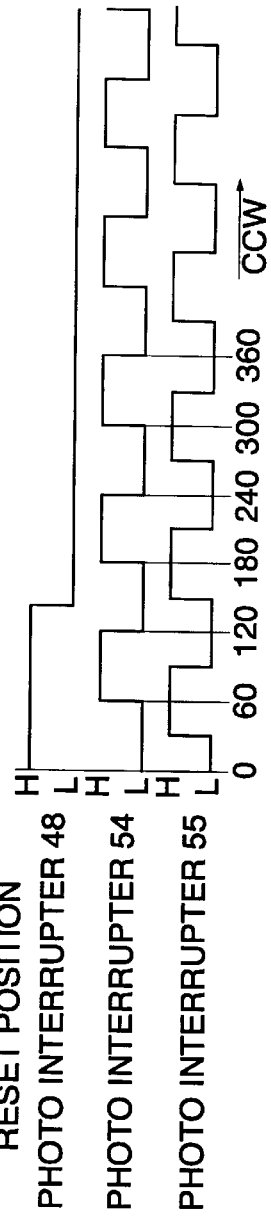

In the present embodiment, the two photo interrupters 54 and 55 are employed as means for detecting the direction of rotation of the zoom motor 35. FIGS. 12B and 12C show output waveforms of the photo interrupters 54 and 55 and output signals from the photo interrupter 48 that determines the initial position (zoom reset position), FIG. 12B showing a case where the zoom motor 35 is rotating in one direction, and FIG. 12C a case where the zoom motor 35 is rotating in the other or reverse direction. When the zoom motor 35 is rotating clockwise (CCW) as viewed in FIG. 11, the waveform of the photo interrupter 55 precedes the waveform of the photo interrupter 54 by ¼ cycles, as shown in FIG. 12B, whereas when the zoom motor 35 is rotating counterclockwise (CCW) as viewed in FIG. 11, the waveform of the photo interrupter 55 lags behind that or the photo interrupter 54 by ¼ cycles, as shown in FIG. 12C.

Thus, the relationship in output timing between the photo interrupters 54 and 55 changes depending on the direction of rotation of the zoom motor 35. Therefore, by detecting this change, the direction of rotation of the zoom motor 35 can be detected to thereby count the number of rotations of the motor with accuracy.

Figure 14:
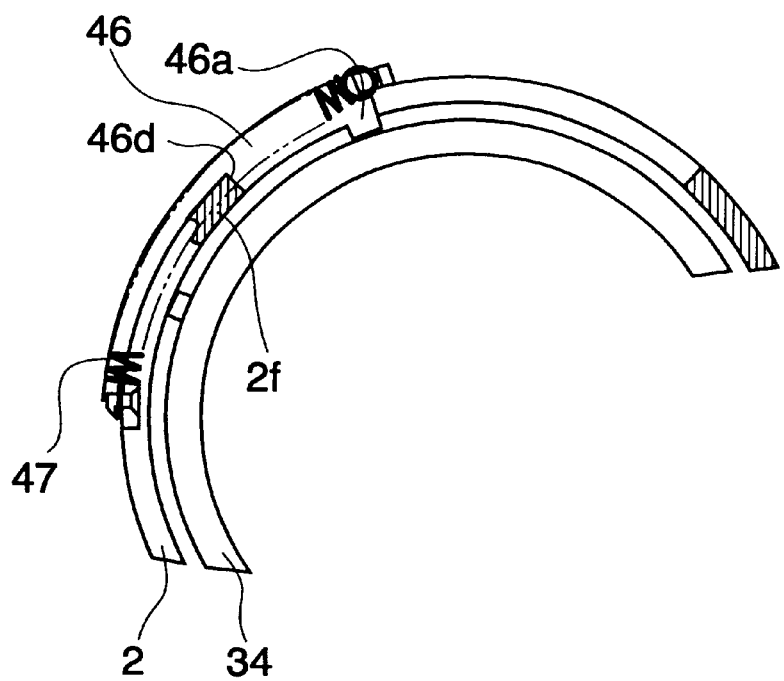
FIG. 14 is a view useful in explaining the operation of a finder cam plate at an initial stage of a variable power operation.

After the lens barrel has thus been driven into the initial position, the lens barrel is further moved into an extreme wide-angle end position where a picture can be taken (wide-angle end position), at a step S5. During this movement of the lens barrel, as shown in FIG. 14, the finder cam plate 46 remains stationary with a guide end 46e thereof being in abutment with a groove end 2f of the fixed barrel 2.

Figure 15:
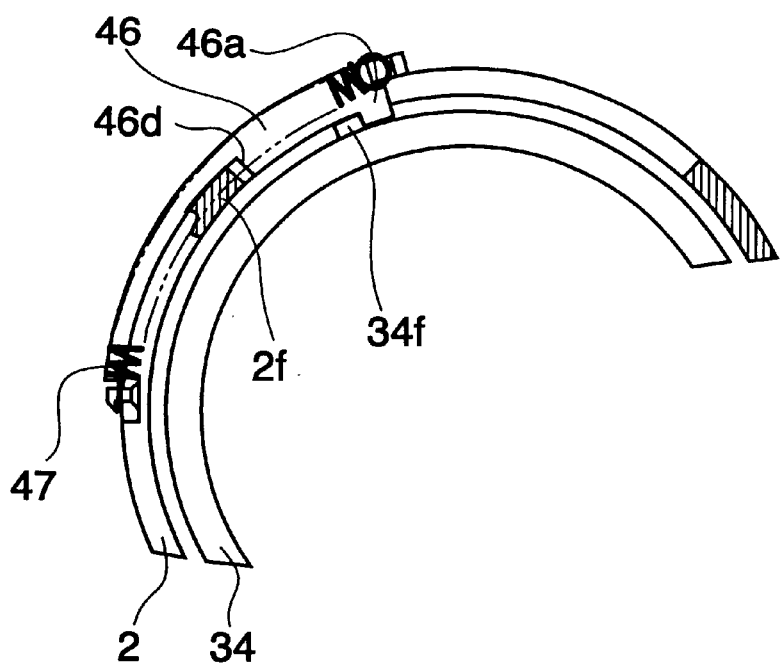
FIG. 15 is a view useful in explaining the operation of the finder cam plate at a middle stage of the variable power operation.
Figure 16:
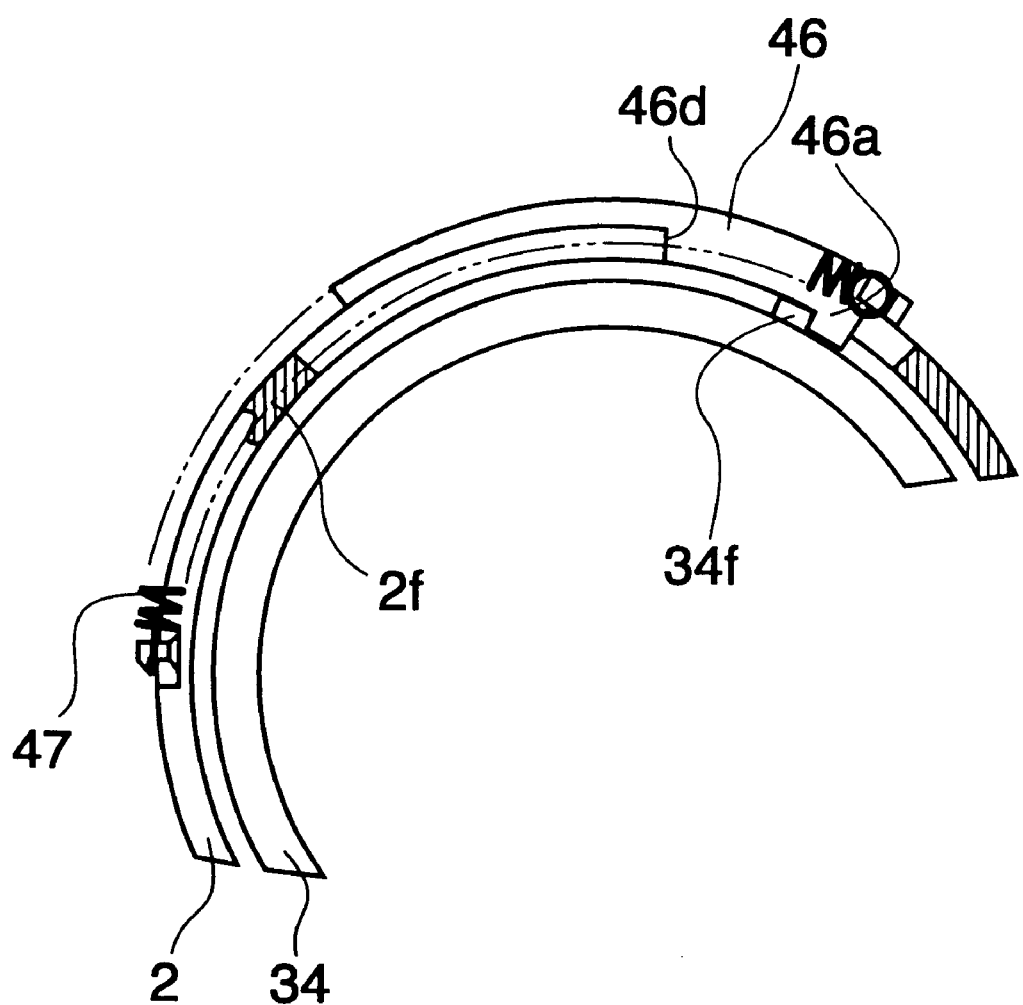
FIG. 16 is a view useful in explaining the operation of the finder cam plate at a final stage of the variable power operation.

Referring to FIG. 15, the finder cam plate 46 and a projection 34f provided on the moving cam ring 34 start to be brought into contact with each other immediately before the lens barrel reaches the wide-angle position. Thereafter, as shown in FIG. 16, as the lens barrel is moved from the wide-angle position to the telephoto position, the finder cam plate 46 is moved together with the moving cam ring 34 while being biased toward the wide-angle position by the tension spring 47, whereby a variater lens and a compensator lens of an optical finder, not shown, are actuated for a power varying operation of the finder in a manner suited to the focal length of the image pickup optical system.

After the lens barrel has been moved into the wide-angle position, the third-group lens barrel 14 which has been in a retreated position is moved to its initial position by the stepping motor 21 at a step S6. More specifically, when the stepping motor 21 is driven, the screw shaft 19 is rotated via the magnet 20. Then, the nut 17, the rotation of which is prevented by the projection 14a of the third-group lens barrel 14, is moved in the direction along the optical axis, and the third-group lens barrel 14 is also moved in the direction along the optical axis in a manner following the nut 17 to adjust the focus. In this process, normally, the slit plate 14b enters or retreats from the slit of the photo interrupter 26 within the stroke of operation of the third-group lens barrel 14, and switches the output of the photo interrupter 26, whereby the count of a counter for detecting the number of steps of the stepping motor 21 is reset to complete the movement of the third-group lens barrel 14 into the initial position.

Therefore, it is determined at a step S7 whether or not the output signal from the photo interrupter 26 has been switched within a predetermined time period. If the output signal from the photo interrupter 26 has not been switched, it is determined that some problem has arisen, and a second error handling process is carried out at a step S10.

On the other hand, if the output signal from the photo interrupter 26 has been switched within the predetermined time period, the stepping motor 21 is further driven to thereby move the third-group lens barrel 14 into a standby position on the wide-angle side. Further, control operations, including control of the diaphragm aperture size, and white balance adjustment, are carried out according to the lightness of an object or the like to complete the preparations for taking a picture of the object, at a step S8.

As described hereinabove, when the camera has thus become ready for taking a picture, the operator can operate a zoom lever, not shown, to a telephoto side, and release the same at a desired zoom position, to thereby set the variable power ratio as desired.

Figure 19:
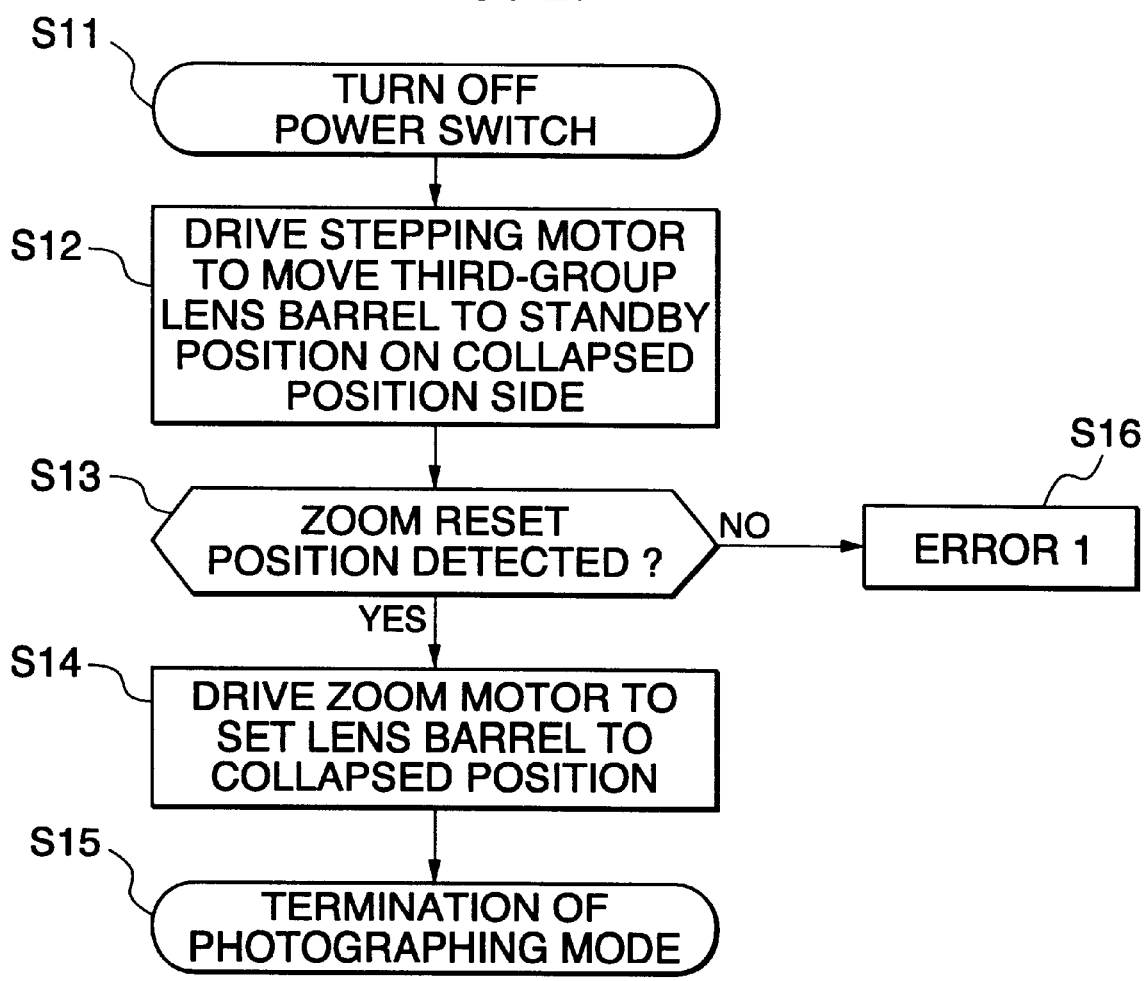
FIG. 19 is a flowchart showing the procedure of a control operation of the FIG. 17 control system when the power of the camera is turned off.

When the operator turns off the power switch 65 at a step S11 shown in FIG. 19, the third-group lens barrel 14 is moved into a standby position on a collapsed position side by the stepping motor 21 at a step S12. In this case, if the third-group lens barrel 14 is properly moved into the standby position on the collapsed position side, the output signal from the zoom-resetting photo interrupter 48 is switched, and hence it is determined at a step S13 whether or not switching in the output signal from the photo interrupter 48 has been detected. If the switching of the output signal from the photo interrupter 48 has not been detected, it is determined that some problem has arisen, and the first error handling process is carried out at a step S16.

On the other hand, if the switching of the output signal from the photo interrupter 48 has been detected, the lens barrel is moved into the collapsed position at a step S14, and then an electrical termination process is carried out, followed by turning off the power at a step S15.

The present invention is not necessarily limited to the above described embodiment, but various changes and modifications may be made without departing from the scope of the appended claims.

For example, the present invention may be applied to a construction that in the above embodiment, the fixed barrel 2 is replaced by a movable barrel.

Still further, the present invention may be applied to a construction that in the above embodiment, the coupling means between the fixed barrel 2 and the moving cam ring 34 is also applied to that between the cam ring and the lens unit.

What is claimed is:

1. An optical apparatus comprising:
   a first barrel;
   a second barrel that is shifted relative to said first barrel to move an optical unit, said second barrel being fitted to said first barrel; and
   first and second engaging portions which can be engaged with each other when said second barrel is in a predetermined positional relationship with respect to said first barrel and which cannot be engaged with each other when said second barrel is not in said predetermined positional relationship with respect to said first barrel, said first and second engaging portions preventing said second barrel from being disengaged from said first barrel and displaced in a direction along an optical axis relative to said first barrel when said second barrel is in said predetermined positional relationship with respect to said first barrel.

2. An optical apparatus according to claim 1, wherein said first barrel comprises a fixed barrel.

3. An optical apparatus according to claim 2, wherein said second barrel comprises a moving cam ring.

4. An optical apparatus according to claim 1, wherein said first and second engaging portions comprise protrusions which can be engaged with each other.

5. An optical apparatus according to claim 1, wherein said first and second engaging portions are provided on said first barrel and said second barrel, respectively.

6. An optical apparatus according to claim 1, wherein said second barrel is brought into said predetermined positional relationship with respect to said first barrel, when said second barrel is shifted forward relative to said first barrel.

7. An optical apparatus according to claim 6, wherein when said second barrel is in said predetermined positional relationship with respect to said first barrel, said second engaging portion is positioned in front of said first engaging portion.

8. An optical apparatus according to claim 1, wherein said optical device comprises a lens barrel.

9. An optical apparatus according to claim 1, wherein said optical device comprises an image pickup device.

10. An optical apparatus according to claim 1, wherein said optical apparatus is in an image-capture state when said second barrel is in said predetermined positional relationship with respect to said first barrel and said optical apparatus is in a non-image-capture state when said second barrel is not in said predetermined positional relationship with respect to said first barrel.

11. An optical apparatus comprising:
    a first barrel;
    a second barrel that is shifted relative to said first barrel to move an optical unit;
    first and second engaging portions which can be engaged with each other so as to fit said second barrel to said first barrel and to shift said second barrel relative to said first barrel; and
    third and fourth engaging portions which can be engaged with each other so as to prevent said second barrel from being disengaged from said first barrel and displaced in a direction along an optical axis relative to said first barrel, said third and fourth engaging portions do not shift said second barrel relative to said first barrel, a range of parts of said third and fourth engaging portions which can be engaged with each other extends along a range of parts of said first and second engaging portions which can be engaged with each other.

12. An optical apparatus according to claim 11, wherein said first barrel comprises a fixed barrel.

13. An optical apparatus according to claim 12, wherein said second barrel comprises a moving earn ring.

14. An optical apparatus according to claim 11, wherein said third and fourth engaging portions comprise protrusions which can be engaged with each other.

15. An optical apparatus according to claim 11, wherein said third and fourth engaging portions are provided on said first barrel and said second barrel, respectively.

16. An optical apparatus according to claim 11, wherein said optical apparatus comprises a lens barrel.

17. An optical apparatus according to claim 11, wherein said optical apparatus comprises an image pickup device.

18. An optical apparatus comprising:
- a first barrel having a first engaging portion and a third engaging portion; and
- a second barrel having a second engaging portion which is engaged with said first engaging portion and a fourth engaging portion which is engaged with said first engaging portion, wherein a range of parts of said first and second engaging portions which can be engaged with each other comprises:
- a first engaging range in which said second barrel rotates in a direction orthogonal to an optical axis relative to said first barrel and shifts in a direction along the optical axis relative to said first barrel, when the first and second engaging portions are engaged with each other, and
- a second engaging range in which said second barrel rotates in a direction orthogonal to an optical axis relative to said first barrel while being prevented from shifting in a direction along the optical axis relative to said first barrel, when the first and second engaging portions are not engaged with each other, said third and fourth engaging portions are engaged with each other when said first and second engaging portions are engaged with each other in said second engaging range.

* * * * *